Oct. 27, 1964

F. A. DAIGLER ETAL 3,154,368

RECORDING MECHANISM

Filed Jan. 23, 1962

INVENTORS
FRANKLIN A. DAIGLER
STEPHEN A. BARTFAY

BY Bean, Brooks, Buckley + Bean
ATTORNEYS

Oct. 27, 1964     F. A. DAIGLER ETAL     3,154,368
RECORDING MECHANISM

Filed Jan. 23, 1962     10 Sheets-Sheet 2

INVENTORS
FRANKLIN A. DAIGLER
STEPHEN A. BARTFAY

BY
Beau, Brooks, Buckley & Beau
ATTORNEYS

Oct. 27, 1964 F. A. DAIGLER ETAL 3,154,368

RECORDING MECHANISM

Filed Jan. 23, 1962 10 Sheets-Sheet 5

INVENTORS
FRANKLIN A. DAIGLER
STEPHEN A. BARTFAY

BY Bean, Brooks, Buckley + Bean
ATTORNEYS

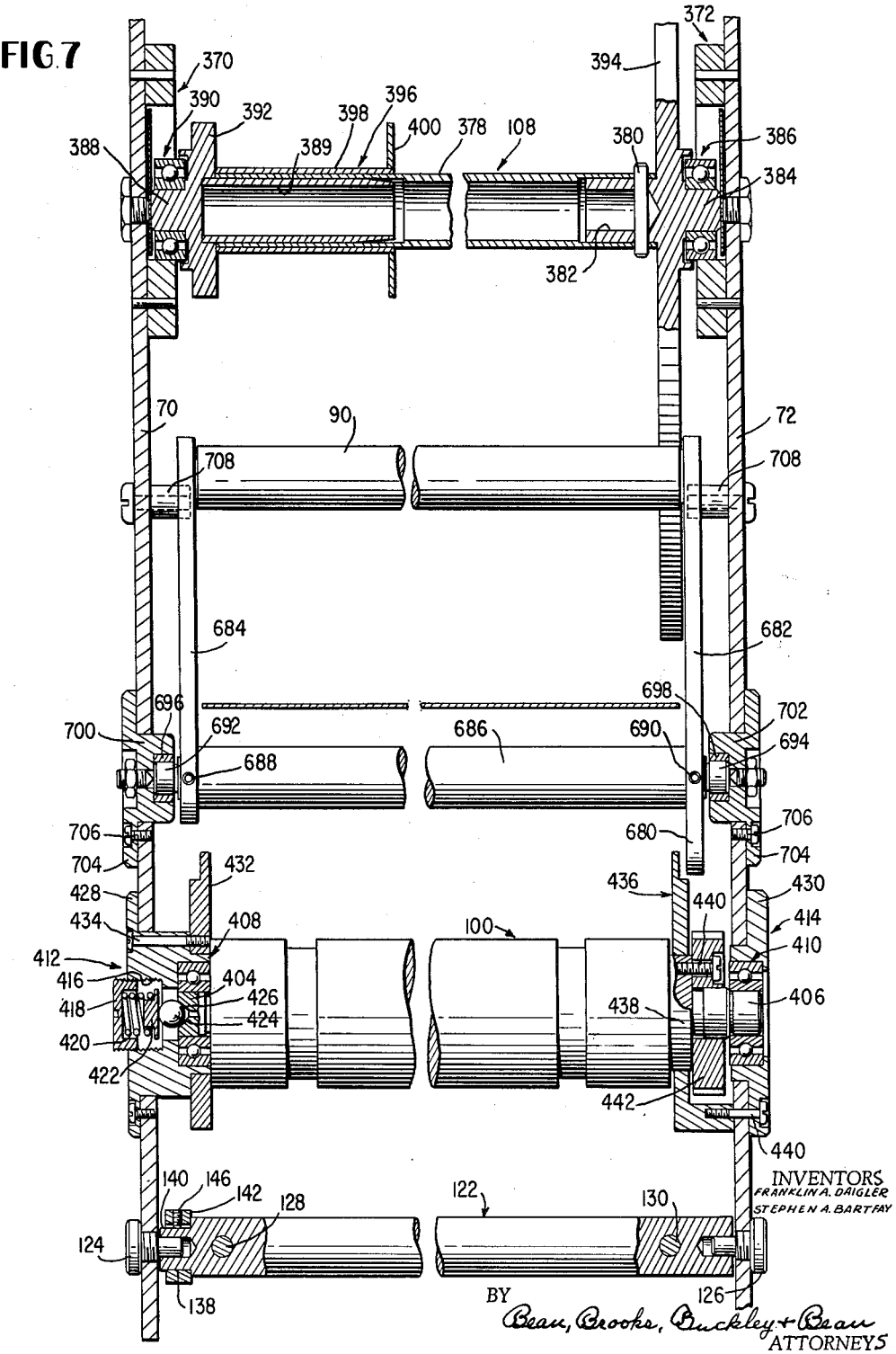

Oct. 27, 1964   F. A. DAIGLER ETAL   3,154,368
RECORDING MECHANISM
Filed Jan. 23, 1962   10 Sheets-Sheet 7

INVENTORS
FRANKLIN A. DAIGLER
STEPHEN A. BARTFAY

BY Bean, Brooks, Buckley & Bean
ATTORNEYS

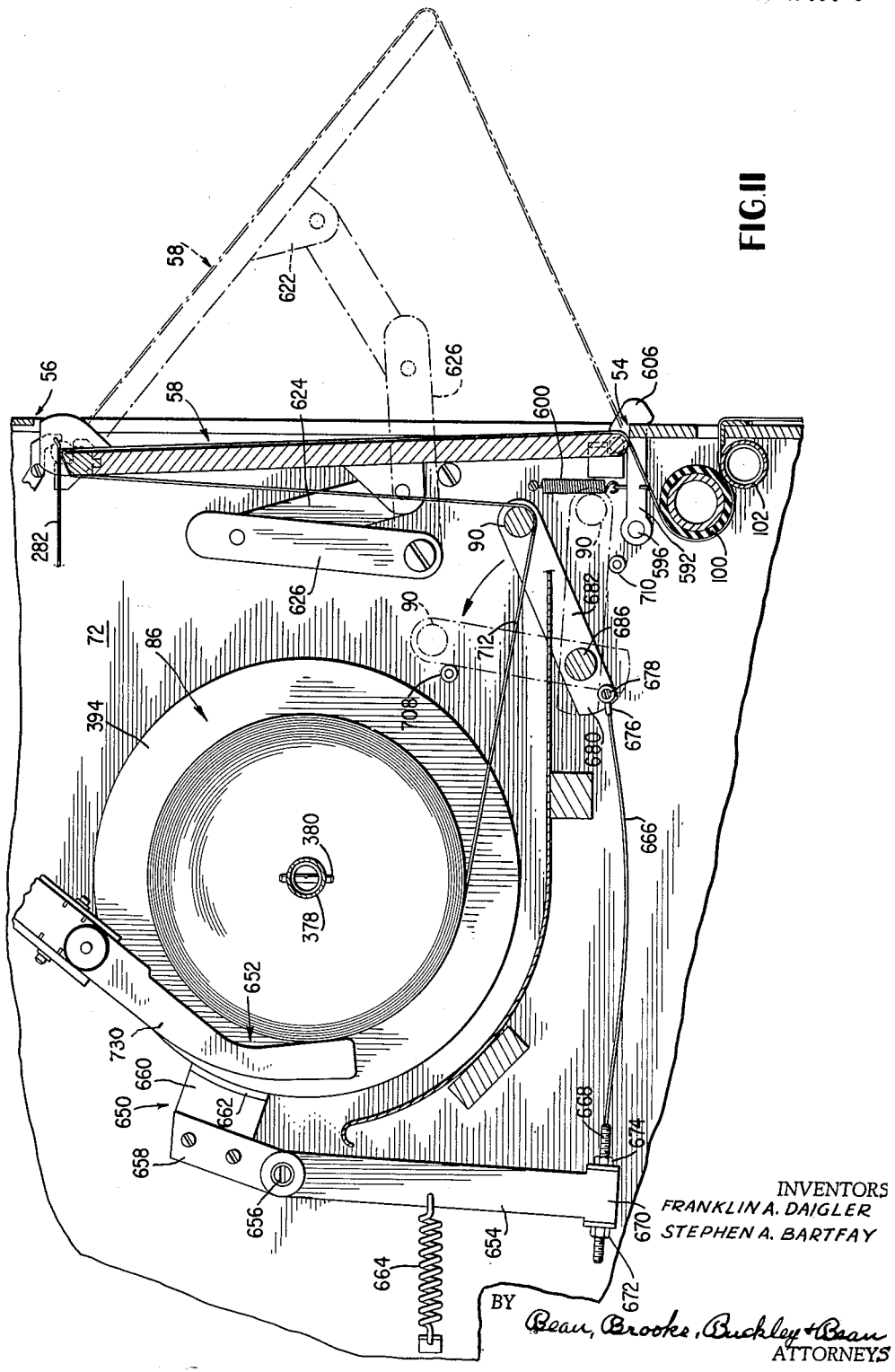

Oct. 27, 1964   F. A. DAIGLER ETAL   3,154,368
RECORDING MECHANISM
Filed Jan. 23, 1962   10 Sheets-Sheet 9
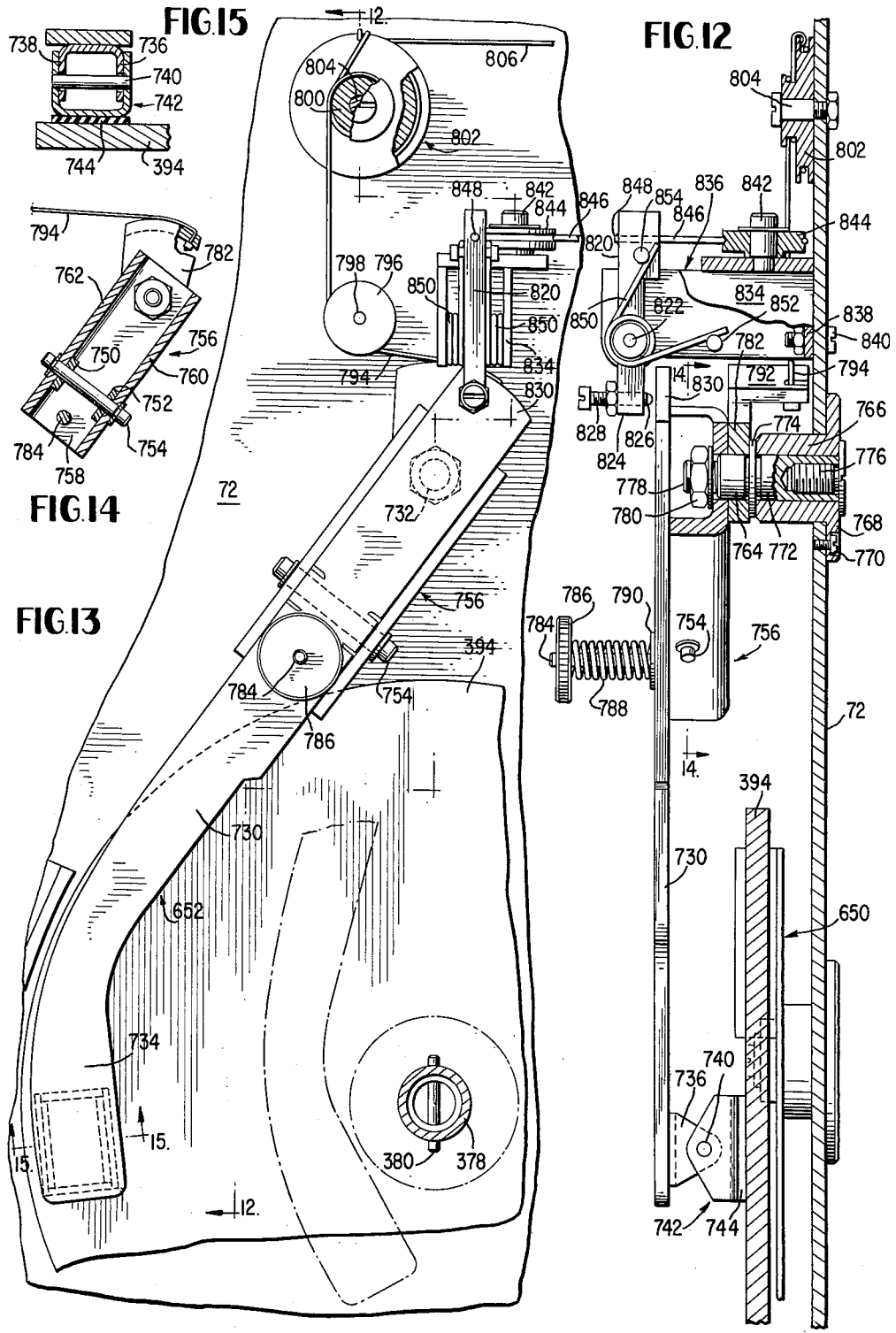

Oct. 27, 1964   F. A. DAIGLER ETAL   3,154,368
RECORDING MECHANISM
Filed Jan. 23, 1962   10 Sheets-Sheet 10
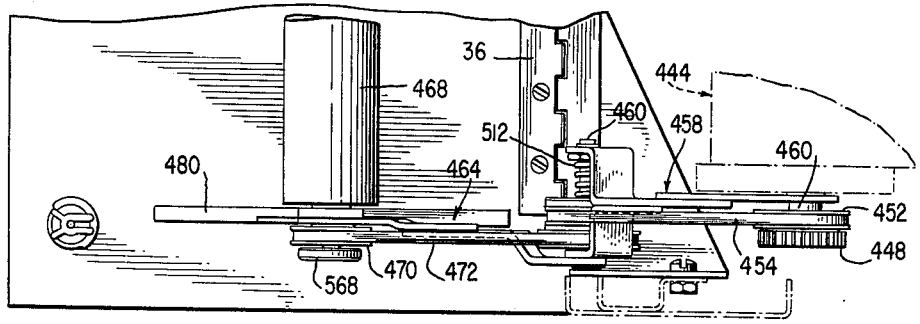
FIG. 17
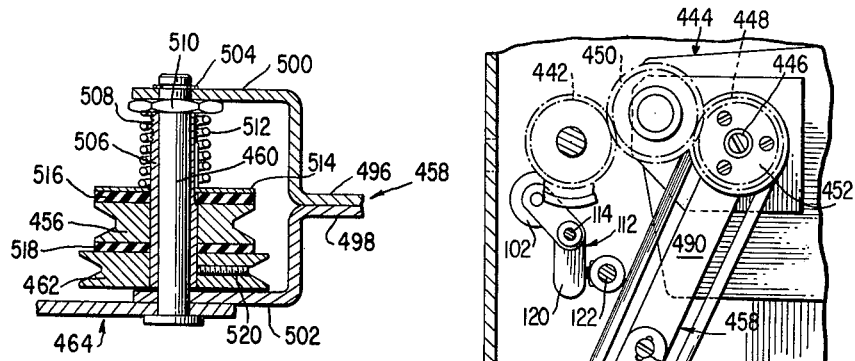
FIG. 18
FIG. 16
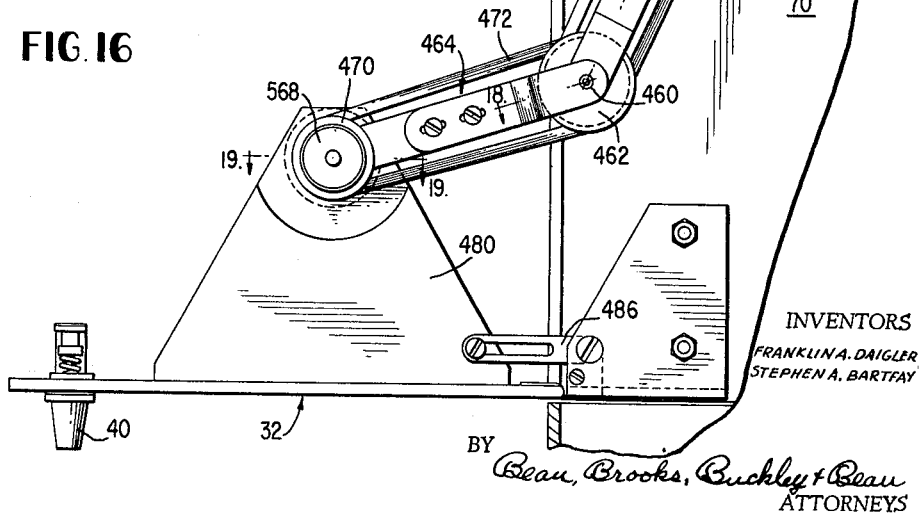
INVENTORS
FRANKLIN A. DAIGLER
STEPHEN A. BARTFAY
BY Bean, Brooks, Buckley & Bean
ATTORNEYS

3,154,368
RECORDING MECHANISM

Franklin A. Daigler, Lockport, and Stephen A. Bartfay, Buffalo, N.Y., assignors, by mesne assignments, to Esterline-Angus Instrument Company, Inc., Indianapolis, Ind., a corporation of Delaware
Filed Jan. 23, 1962, Ser. No. 168,185
11 Claims. (Cl. 346—68)

This invention relates to recording machines in general and more particularly pertains to a paper transport system utilized in conjunction therewith.

It is frequently desirable for engineering and other purposes to achieve the simultaneous recording of several dependent or independent phenomena. For example, it might be desirable in the structural analysis of an aircraft wing to determine the stress to which the structural member is subjected at several different points thereon due to external loads applied. In general, this would be accomplished by placing suitable mechanisms at the desired points of the structural member which would be ultimately responsible for the production of electrical impulses or indications which affect the recording machine in such ways as to cause movement of individual styli with which the separate mechanism are associated. Thus, the continuous recording may be achieved for each of the different regions of the structural member under consideration. For this purpose, the styli mark a recording sheet or strip in accordance with the information supplied thereto. The present invention relates to the paper transport system upon which these recordings are made.

According to the present invention, the paper transport system incorporates certain novel combinational relationships wherein the paper is transported in such manner so as to achieve a substantially uniform tension thereon regardless of the speed at which the paper is driven. To this end, it will be readily appreciated that under different conditions of operation, it may be desirable to drive the paper at a greater or lesser speed. For example, if the movement of the styli or stylus as the case may be are sufficiently rapid, it may be desirable to drive the paper at a more rapid speed so as to spread the recorded information over a greater linear distance on the sheet or strip of recording paper so as to render the recorded data more intelligible for subsequent examination.

It is another object of the present invention to provide a paper transport system which is characterized in that the recorded data is readily observed immediately upon the recording sheet and wherein provision is made whereby suitable notations may be made manually upon the recording sheet without interrupting the operation of the system.

Other objects and advantages of the invention will appear from the description hereinbelow and the accompanying drawings wherein:

FIG. 7 is a vertical section similar to FIG. 5 but showing the recording paper transport system exclusive of the takeup mechanism therefor;

FIG. 11 is an enlarged sectional view showing the recording paper supply mechanism illustrating the principal compound brake system utilized in association therewith and also showing, in dotted lines, the front panel in position for use as a notation shelf;

FIG. 12 is an enlarged sectional view taken substantially along the plane of section line 12—12 in FIG. 13 showing details of the constant-tension brake associated with the supply roll;

FIG. 13 is an elevational view of the constant tension supply roll brake;

FIG. 14 is a sectional view taken substantially along the plane of section line 14—14 in FIG. 12 showing details of the pivot connection for the constant-tension supply roll brake;

FIG. 15 is a transverse sectional view taken substantially along the plane of section line 15—15 in FIG. 13 showing details of the brake shoe mounting mechanism for the constant-tension brake;

FIG. 16 is a vertical section taken through the recording device showing the mounting and drive for the recording paper takeup mechanism;

FIG. 17 is a plan view of the assembly shown in FIG. 16;

FIG. 18 is an enlarged sectional view taken substantially along the plane of section line 18—18 in FIG. 16 showing details of the overload release clutch utilized in conjunction with the recording paper takeup mechanism.

Figures 1, 19:
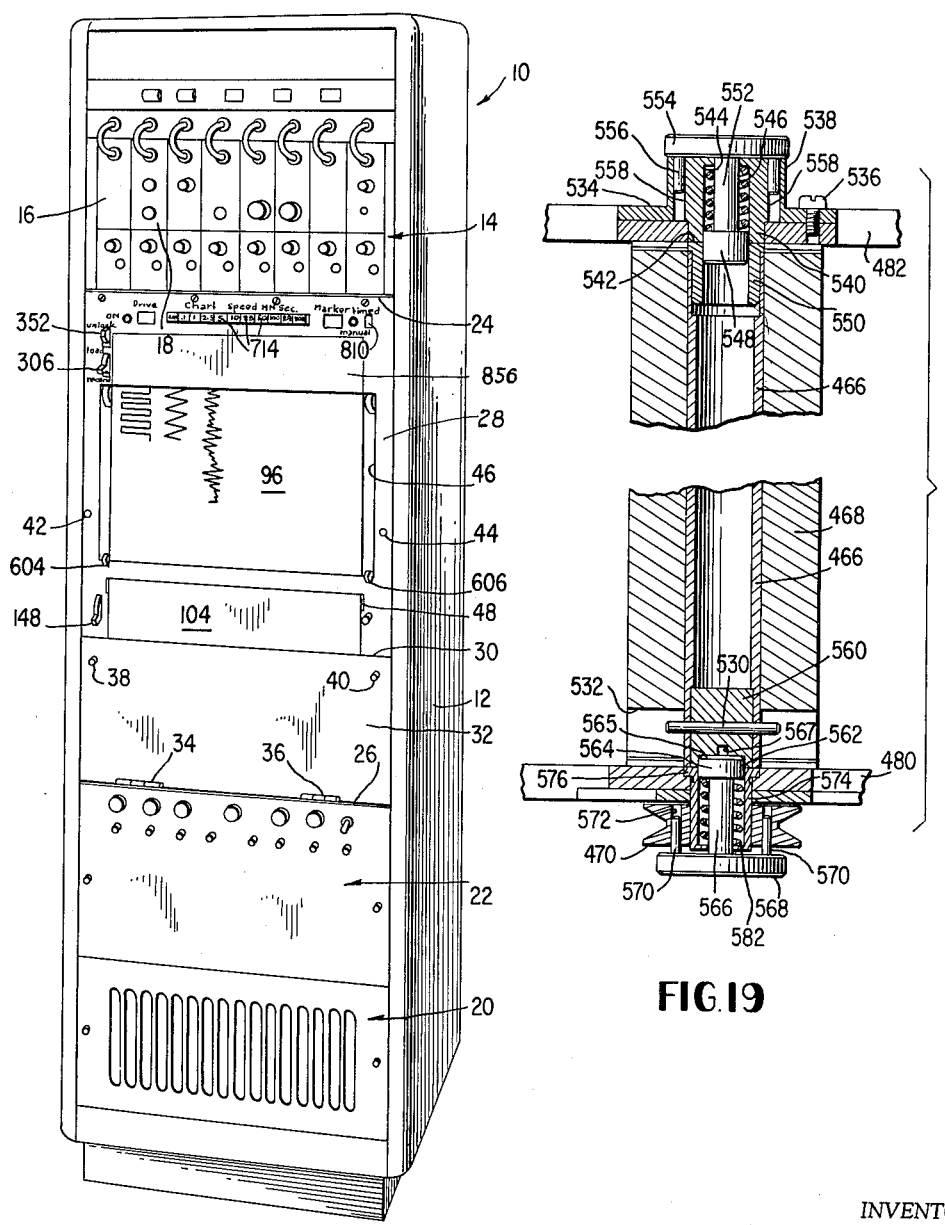
FIG. 1 is a perspective view of a recording machine utilizing the principles of the present invention.
FIG. 19 is an enlarged sectional view taken substantially along the plane of section line 19—19 in FIG. 16 showing details of the recording paper takeup roll and its mounting.

Referring now more particularly to FIG. 1, the recording machine in its entirety as is designated therein generally by the reference character 10 and the particular instance shown will be seen to consist of an upright cabinet 12 within which the component parts of the machine are housed. The upper section of the machine designated by the reference character 14 is utilized to house the principal component of the circuitry of the mechanism and as is specifically shown, these components are incorporated in separate packs such as those indicated by reference characters 16 and 18 which are separately removable and replaceable generally in accordance with well known practice for electronic component package assemblies. The lower portion of the mechanism as is indicated by the reference character 20 houses a cooling air component and other electric components as is indicated by the reference character 22. The foregoing components form per se no part of the present invention and the same are briefly described as above only for the purpose of clarity insofar as their combinational relationship with the remaining structure is concerned.

The paper transport system in accordance with the present invention is housed within the cabinet 12 within that area thereof defined between the parting lines 24 and 26. As is specifically shown, part of the system is housed within a drawer construction which includes a rigid front panel 28 extending between the aforementioned parting lines 24 and extending down to the parting line 30. The upper and lower edges of the drawer are designated U and L in FIG. 3. Below this drawer is a swingable front panel member 32 hinged as at 34 and 36 to suitable brackets 35 mounted on the cabinet side walls 37 so as to be swung downwardly as will hereinafter appear. Insofar as the panel 32 is concerned, the same is provided with releasable locking fasteners 38 and 40 by means of which this panel is normally held in this vertical position as is shown in FIG. 1 but by means of which it is releasably attached to the cabinet construction so as to be swung downwardly about the hinges 34 and 36. Likewise, the rigid front panel 28 is provided with locking members 42 and 44 which normally hold the entire drawer in retracted position as is shown but which, upon their release, permits the drawer assembly to be pulled out as aforesaid. It is to be noted that assemblies 20 and 22 may also be of drawer form.

The front panel 28 is provided with a rectangular opening 46 and, immediately therebelow, a smaller rectangular opening 48, the purpose of which will be presently apparent.

Figure 2:
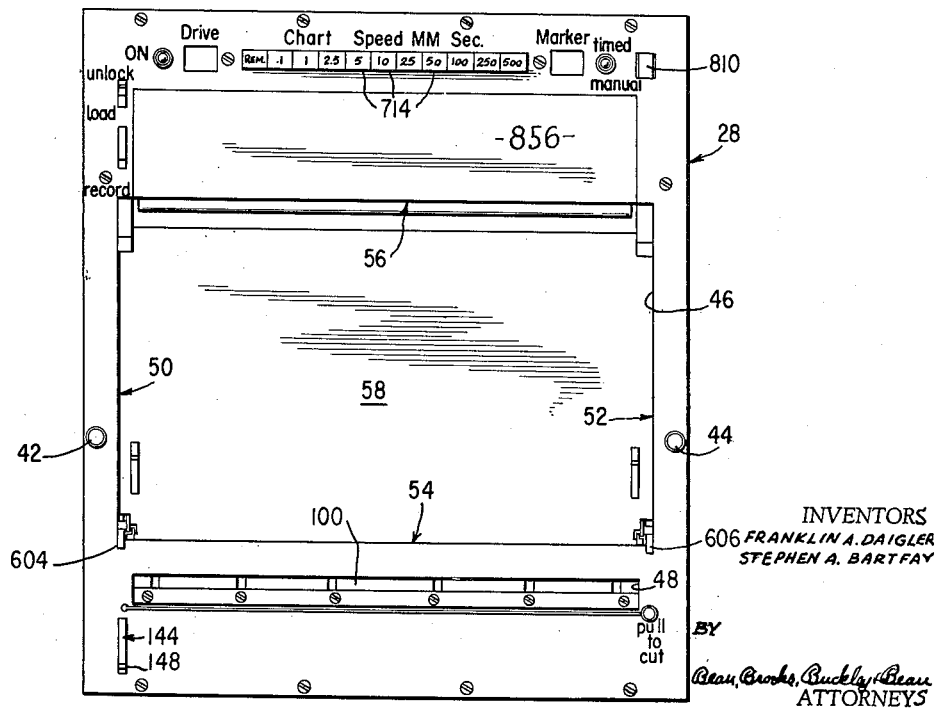
FIG. 2 is a front elevational view of the drawer unit of the mechanism shown in FIG. 1 which forms a supporting base for the paper transport system and the mechanism associated therewith.
Figure 4:
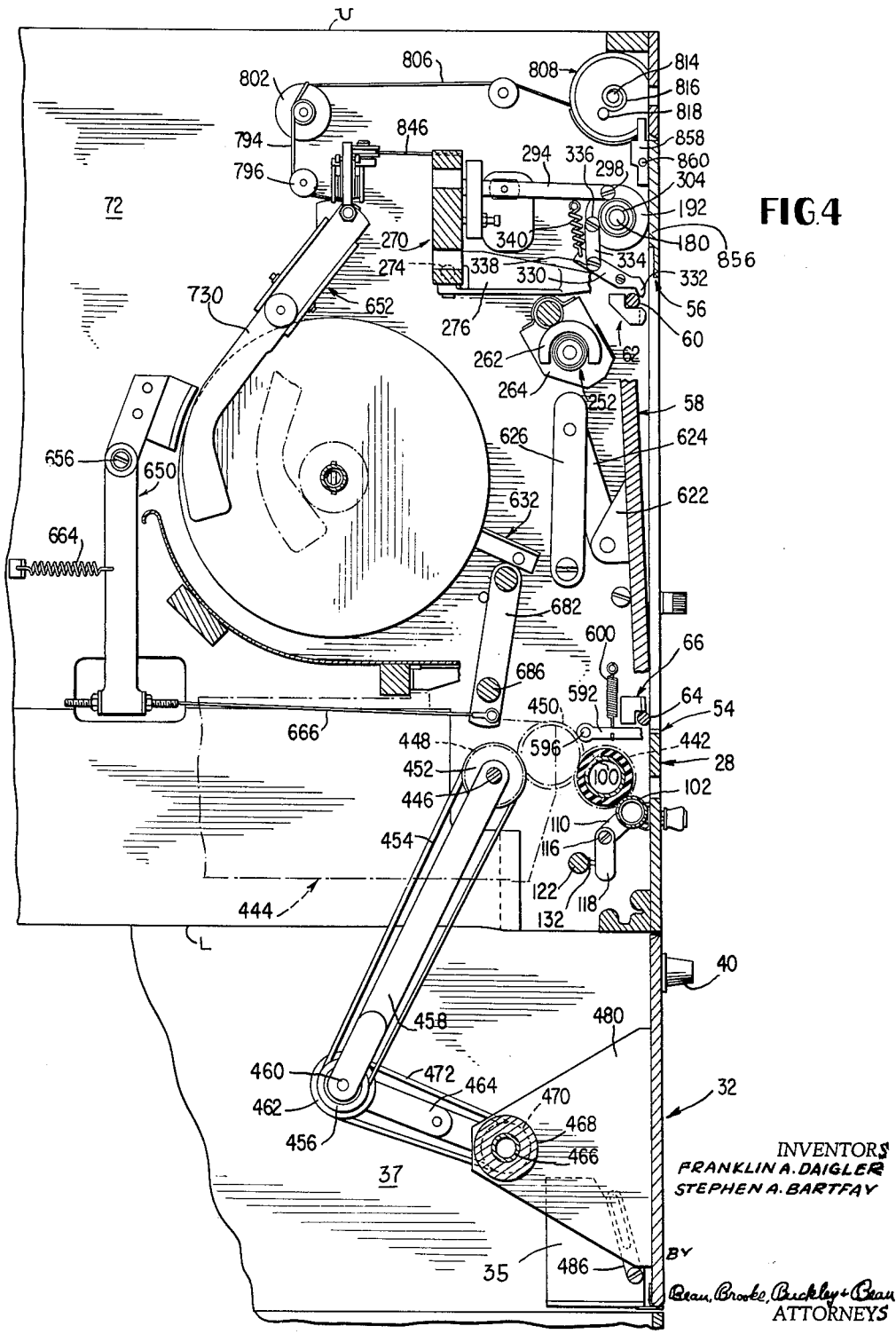
FIG. 4 is a view similar to FIG. 3 but looking in the opposite direction.
Figure 10:
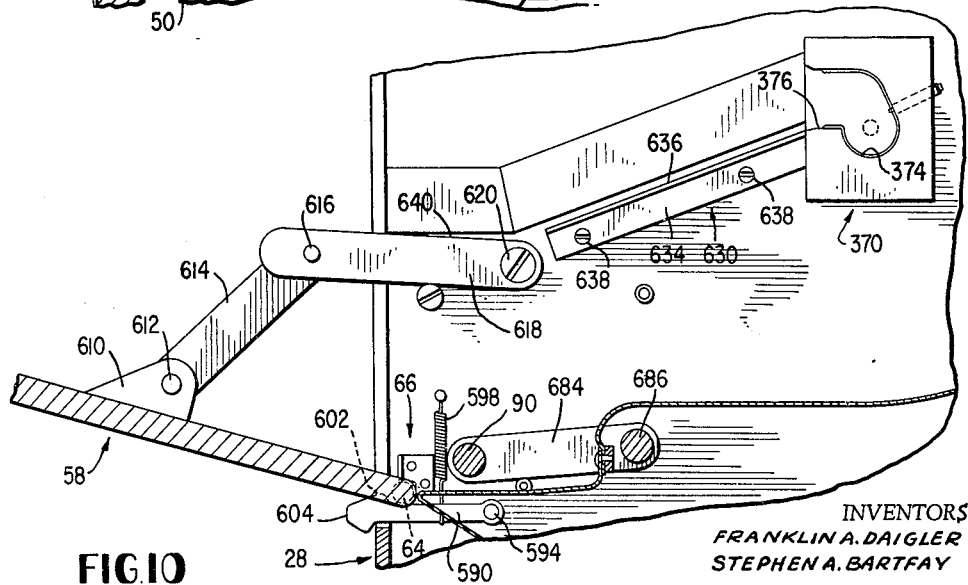
FIG. 10 is an enlarged sectional view showing a portion of the machine below the section shown in FIG. 9 and illustrating the compartment for receiving a fresh supply of recording paper.

Referring now more particularly to FIG. 2, the opening 46 in the front panel assembly 28 will be seen to extend vertically along the opposite side edges 50 and 52 between the lower horizontal edge of the opening 54 and the upper edge extremity 56 of such opening. Positioned within this opening 46 is a swingable panel 58 having means hereinafter more fully described so that this panel 58 is pivoted to the drawer structure either along its upper horizontal edge or along its lower horizontal edge. Thus, the normal position of the panel 58 is as is shown in FIG. 11 in full lines therein. FIG. 11 also shows in dotted lines an alternate position of the panel 58 as occasioned by the pivotal movement along its horizontal edge whereas a further alternate position of the panel 58 wherein it is pivoted about its lower horizontal edge is shown in FIG. 10. FIG. 4, on the other hand, will serve to more clearly illustrate the manner in which the panel 58 is positioned relative to the drawer construction. In FIG. 4, it will be appreciated that the upper corners of the panel 58 are provided with laterally directed pins such as the pin 60 shown in FIG. 4 cooperable with a locating bracket 62 and it will also be seen that the lower corners of the panel 58 are provided with laterally projecting pins such as the pin 64 in FIG. 4 cooperable with a retaining bracket 66. That is to say, there are two of the locating brackets 62 associated with two pins 60 at either side of the drawer structure and that there are also two pins 64 cooperable with oppositely disposed retaining brackets 66.

Figure 5:
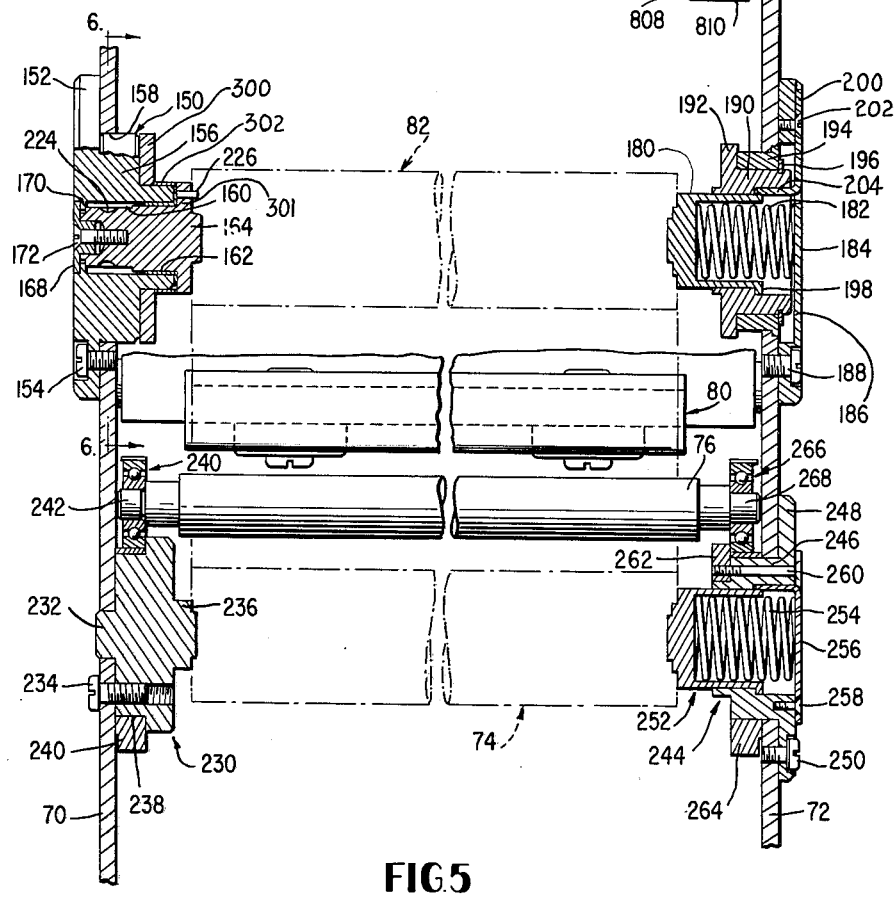
FIG. 5 is a vertical section, taken adjacent the front of the paper transport system looking toward the rear and showing the various components of the carbon paper transport mechanism and also showing a portion of the indicating mechanism for depicting the remaining footage on the recording paper supply.

Referring this time more particularly to FIG. 5, it will be appreciated therefrom that the structural assembly which houses the paper transport system in accordance with the present invention, in this specific instance, a drawer construction operatively mounted in the cabinet 12, includes opposite side wall portions 70 and 72, rigidly interconnected and held in spaced general parallelism by any suitable and necessary rigidifying means extending therebetween. Thus, it will be appreciated that the front panel portion 28 is rigidly affixed to these side walls 70 and 72 and that various instrumentalities, as hereinafter defined, are mounted between these side walls which form a rigid base therefor. Thus, referring to FIG. 3, the transport system in accordance with the present invention envisages the positioning of a supply of carbon transfer paper or its equivalent 74 in which the sheet of transfer paper passes upwardly therefrom over an idler bar 76 mounted between the side walls 70 and 72 and thence passes therefrom, as indicated by reference character 78, to pass over a guide strip 80 for ultimate disposition on the takeup roll 82. Thus, it will be seen that FIG. 5 depicts the carbon transfer paper system.

Figure 3:
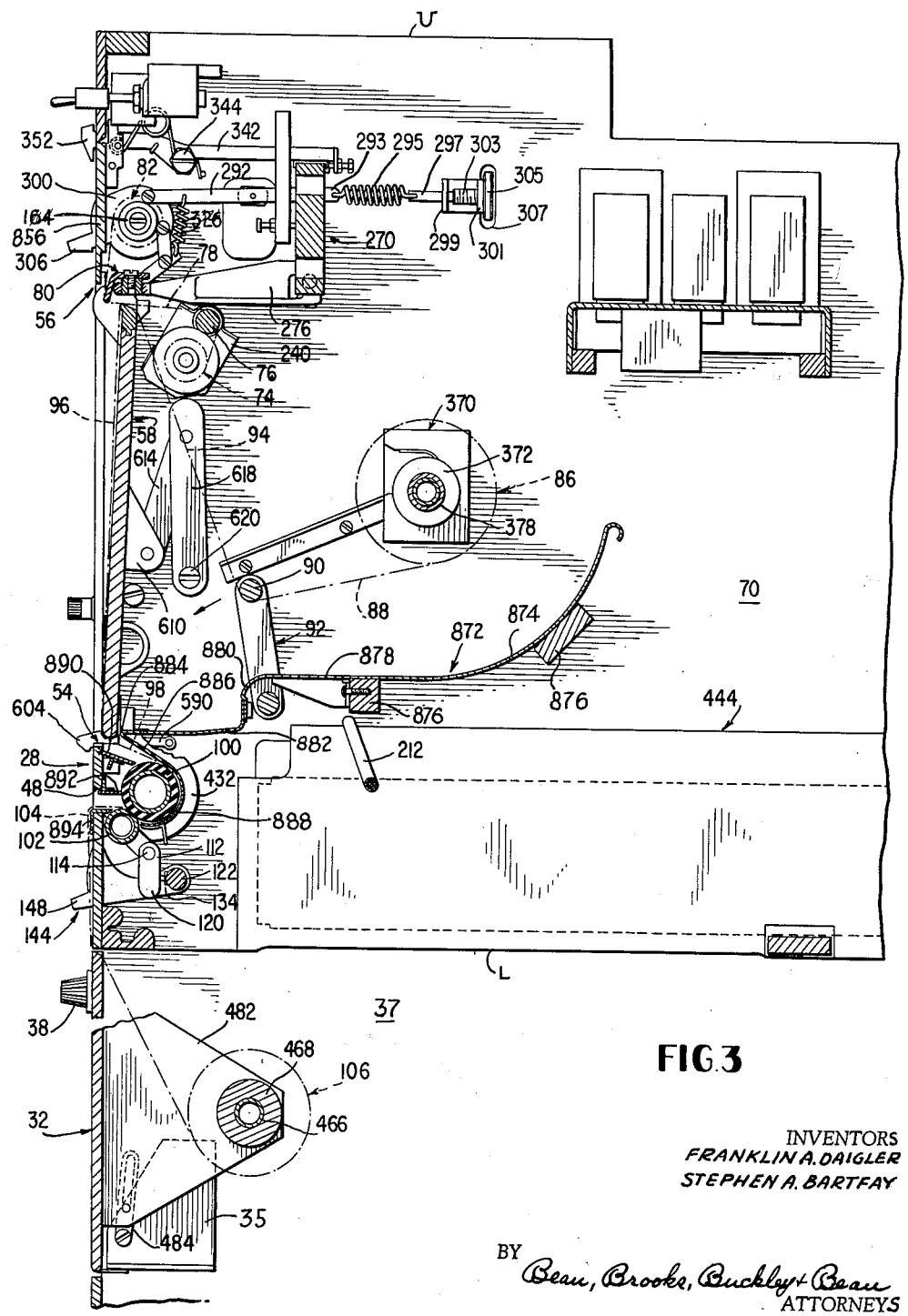
FIG. 3 is a vertical section, on enlarged scale, taken through the mechanism shown in FIG. 2.

Likewise, see FIG. 3, the recording or chart paper system will be seen to include a supply roll 86 therefor in which the sheet of chart paper issues therefrom as at 88 to pass under the horizontal transverse bar 90 of a slack takeup mechanism 92 and then passes upwardly therefrom as at 94 to pass over the upper edge of the panel 58 and thence downwardly over the front face of the movable panel 58 as at 96 to be trained over the lower edge of such panel 58 and to pass, as at 98, over a drive roll assembly 100 and then between a pinch roll 102 and this drive roll assembly 100 to pass outwardly of the panel opening 48 as at 104 and thence downwardly between the lower edge of panel 28 and the upper edge of panel 32 for ultimate disposition on a takeup roll 106. This system is shown more clearly in FIG. 7 of the drawings wherein the supply roll 86 is represented by the core 108 therefor. The pinch roll 102 which is not shown in FIG. 7 will be seen, from a study of FIGS. 3 and 4, to be rotatably mounted by means of bracket members 110 and 112 pivotally mounted to the side walls 70 and 72 as at 114 and 116 respectively and having depending arm portions 118 and 120 by means of which the pinch roll 102 is urged into engagement toward the drive roll 100 to sandwich the chart paper or sheet therebetween. This is accomplished by virtue of the fact that the actuating shaft 122 is pivotally mounted at its opposite end by suitable pivot members 124 and 126, see FIG. 7, which extends through the respective side walls 70 and 72, which actuating shaft 122 carries a pair of threaded stud members 128 and 130 which normally bear against the depending arm portions 118 and 120 so as to achieve the desired pinching action. Any suitable means such as nut members 132 and 134 are associated with the studs 128 and 130 to adjustably position the same to achieve a greater or lesser pinching action, as is desired. One end of the actuating shaft 122 is provided with a reduced portion 138 provided with a flap 140 and the hub 142 of an actuating member 144 is received on such reduced portion 138 and carries a suitable set screw 146 cooperable with the flap 140 to effect a rigid connection between the actuating member 144 and the actuating shaft 122. Thus, as the finger 148 of the actuating member 144, see particularly FIG. 3, is raised, the studs 128 and 130 will be caused to disengage the depending arms 120 and 122 to thus disestablish the pinch roll action. This operation will of course take place at any time it is desired to thread a new supply of chart paper or sheet in the transport system.

Referring back to FIG. 5, the details for the transport system of the transfer sheet will be more clearly evident. In this figure, it will be seen that the side wall 70 carries a pillow block assembly 150 having a flange portion 152 contacting the outer side of the side wall 70 and secured thereto as by fasteners 154. The reduced diameter hub portion 156 of this assembly projects through a suitable opening 158 in the side wall 70 and is provided with an axial bore 160 receiving a suitable bushing 162 by means of which the drive spindle 164 is rotatably mounted in the hub 156. Axial location of and retention of the spindle 164 is achieved by means of a cap member 168 bearing against one side of the flange 170 formed in the pillow block assembly 150 and against the opposite face of which a shouldered portion of the spindle 164 bears. A suitable fastener element 172 serves to fix the cap 168 to the spindle 164 as shown.

Opposite the spindle 164 is a retractable spindle 180 which, as can be seen, is of generally cup shaped configuration and houses therewith a compression spring 182 which bears at its opposite end against the seat portion 184 of a cover plate assembly 186 affixed to the side wall 72 as by suitable fasteners 188. The spindle 180 is mounted within a sleeve 190 which in turn is journalled, for a purpose hereinafter described, in the mounting spindle 194. The sleeve 190 is provided with an annular flange 192 having a release function hereinafter described, engaging against the inner face of the spindle 194 and a circlip 196 serves, in conjunction with this annular flange 192, to axially restrain the sleeve 190. To prevent complete withdrawal of the spindle 180, the same is provided with a flange 198 which projects radially as shown to bear against the shoulder provided by the counterbore in thimble 190. For tensioning purposes, the spindle 180 is non-rotatably mounted and, to this end, a sheet metal key 200 is provided which is secured, as at 202, to the cover plate 186 and includes an axially directed finger 204 projecting into the counterbore in thimble 190 and cooperable with flange 198 of spindle 180 to prevent such spindle from rotating.

Figure 6:
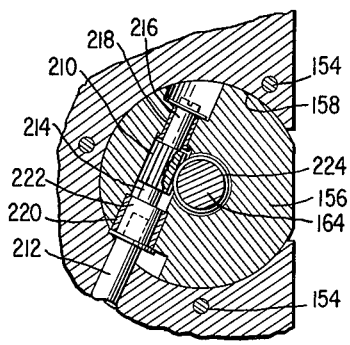
FIG. 6 is a sectional view taken substantially along the plane of section line 6—6 in FIG. 5 illustrating the drive for the carbon paper takeup mechanism.

As can be seen in FIG. 6, the spindle 164 is directly rotated by means of a worm gear 210 coupled to a suitable flexible shaft 212. The rigid shaft 214 which carries the worm has a free end portion 216 rotatably mounted by suitable bushing 218 captive within the hub 156 and located within a suitable bore therein. A further bushing 220 rotatably supports the opposite end 222 of the shaft 214. The exterior of the spindle 164 is provided at the appropriate place with worm gear teeth as at 224 and it is to be understood that the flexible shaft 212 is connected to a transmission mechanism hereinafter described. The face of the spindle carries a drive pin member 226 as can be seen in FIG. 5 for imparting rotation to the associated takeup roll 82 upon which the transfer sheet is wound during operation of the paper transport system. The supply of transfer material, as indicated by reference character 74 is mounted on a fixed spindle member indicated generally by reference character 230 which is provided with a reduced diameter nipple 232 received in a suitable opening of the side wall 70, there being fastening elements such as the members 234 to hold this assembly 230 in place as is shown. The inner side of this assembly is provided with a spindle portion 236 to receive one end of the supply roll 74. The exterior of the assembly 230 adjacent the wall 70 is stepped as at 238 and receives thereon a pillow block plate 240 which mounts a ball bearing 242 by means of which the idler shaft 76 is rotatably supported at one end portion 242 thereof. Mounted on the opposite side wall 72 is a further spindle assembly indicated generally by the reference character 244 which will be seen to include a mounting sleeve 246 having an enlarged flange 248 engaged against the outer side of the wall 72 and secured thereto as by fasteners 250. A retractable cup like spindle 252 is slidably received in the central bore of the assembly 246 and the compression spring 254 received within this spindle member 252 is seated at its opposite end against the key 256 (similar in construction and purpose to key 200) secured by fasteners 258 and 260 to the outer face of the flange 248. Certain of the fasteners such as the fasteners indicated by the reference character 260 extend completely through the mounting sleeve 246 and engage a semi-circular retaining plate 262 axially positioning the pillow block plate 264 which carries the ball bearing 266 rotatably receiving the other end 268 of the idler shaft 76.

Figure 8:
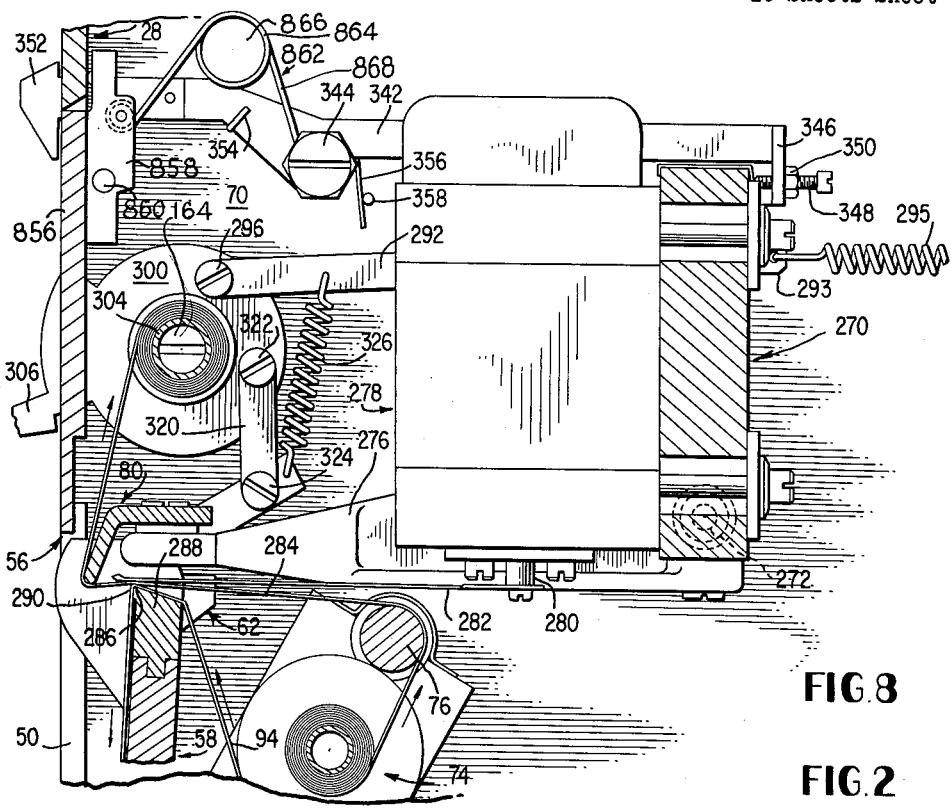
FIG. 8 is an enlarged sectional view showing portions of the carbon paper and recording paper transport systems and the cooperative association with one of the stylus mechanisms and also serving to illustrate the stylus matting frame.

Referring at this time more particularly to FIG. 8, the assembly for mounting the styli and the associated drive motors therefor will be clearly seen. In this figure, there will be seen to be provided a vertical strap or plate indicated generally by the reference character 270 which is pivotally mounted at its opposite end as at 272 and 274 as is seen respectively in FIGS. 8 and 4, to the corresponding side walls 70 and 72. This constitutes the only direct point of attachment between the mounting plate 270 and the side walls 70 and 72 so that the plate 270 is permitted to pivot about the axis defined by these two pivots 270 and 274 as between the positions shown in FIG. 8 and the position shown in FIG. 9.

This plate 270 carries a plurality of forwardly projecting arms such as those indicated by the reference character 276 in FIG. 8 which mount, at their forward free ends the guide plate member 80 previously mentioned. This plate also mounts a series of motors indicated generally by the reference character 278 having drive shafts 280 depending therefrom and upon which the needle like styli 282 are affixed. As can be seen in FIG. 8, each stylus 282 projects forwardly from its actuating shaft 280 to rest upon the sheet 284 of transfer paper directly in alignment with the edge 286 defined by the sloped upper edge component 288 of the panel member 58. Directly beneath this point of contact between the stylus 282 and the transfer paper 284, the sheet of recording paper or chart paper 290 is located for that, in response to pressure of the stylus 282 against the transfer paper or sheet 284, a mark will be made on the chart 290. At this point, it may be well to set forth that it is preferred that the transfer paper or sheet be in the form of Mylar having a suitable coating of carbonaceous material thereon.

Figure 9:
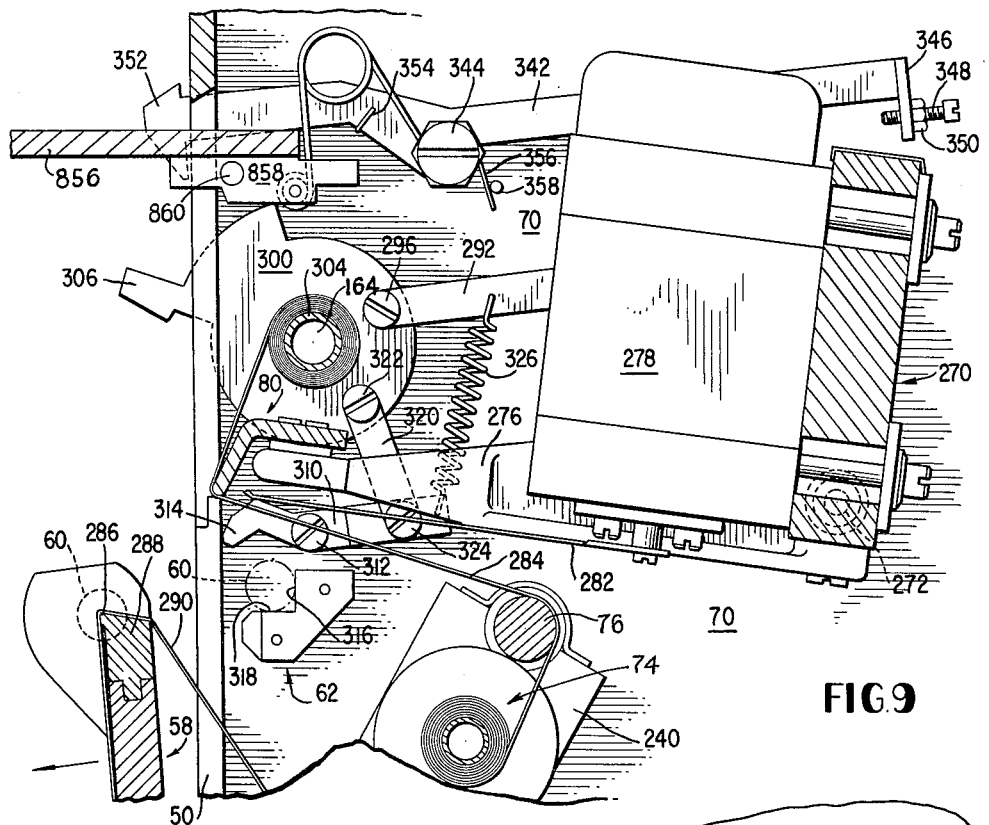
FIG. 9 is a view similar to FIG. 8 but showing the position of the component parts when the device is released for the introduction of a new supply of recording paper.

Adjacent each end of the member 270 are pivotally mounted forwardly extending links 292 and 294, see FIGS. 8 and 4, respectively, and each is pivotally mounted at its forward free end, as indicated by reference characters 296 and 298, to actuating cam members 300 and 192 respectively. The former of these cam members is rotatably mounted on the reduced diameter portion 301 of the tub 156, see particularly FIG. 5. The bushing 162 encloses the end of portion 301 and includes a flange 303 axially restraining the cam 300. The annular flange 192 of sleeve 190 serves as the counterpart for cam 300 as will also appear from FIG. 5. The cam member 300 is provided with a protruding finger 306 projecting through a suitable slot in the front panel of the assembly, see particularly FIG. 1, whereby the cam 300 and consequently the other cam 192 may be rotated manually. That is to say, when the cam 300 is manually rotated, this will cause rocking movement of the plate 270 to the rear as is shown in FIG. 9 to actuate both cams 300 and 192, thus lifting the styli, such as the stylus 282, out of contact with the transfer paper and this action will simultaneously lift the guide plate 80 in the manner shown.

The function of this cam 300 is also tied in with the control over the panel member 58 and its pivotal mounting as achieved by the pins 60. Thus, a retaining finger 310 is pivotally mounted as at 312 to the associated side wall 70 and the hook like end 314 of this member which normally engages over the pin 60 and maintains the same in contact with the right angularly disposed locating surfaces 316 and 318 permits the pin to move as is shown in FIG. 9. This finger member 310 is controlled by a suitable link 320 pivotally connected at its opposite ends as at 322 and 324 to the cam 300 and the finger 310 respectively. A tension spring 326 is interposed between the finger 310 and the link 292 tending to normally urge the cam to the position shown in FIG. 8. There is a similar connection for the cam 192 at the opposite side of the assembly as is shown in FIG. 4. In this instance, as is seen in that figure, there is provided a locking finger 330 having a hook end portion 332 engageable with the pin 60 as shown and connected to the cam 192 by means of a link 334. This link is pivotally connected at its opposite ends as at 336 and 338 between the cam 192 and the finger 330. A tension spring 340 is connected between the side wall 72 and the finger 330 to normally urge the same to downwardly extending lock position as is shown.

As shown more clearly in FIG. 3, the plate or frame assembly 270 is normally urged toward the inoperative position of the styli in opposition to springs 326 and 340, although the latter are of sufficient strength to nearly counterbalance. This opposing effect is achieved by means of spring 295 anchored at one end to tab 293 fixed to frame 270 and at its other end to the supporting framework. For anchoring the spring 295 to the framework, a bracket having outstanding legs 299 and 301 is provided, the latter of which journals a screw 303 with nut 305. The screw 303 includes a projecting end portion 297 connecting to spring 295 so that manipulation of nut 305 will adjust the tension of spring 295. Nut 305 is of sufficient diameter to project through opening 307 in side wall 70 so as to be accessible from outside and permit adjustment of screw 303 whereby the tension of spring 295 may be adjusted such that once the parts have been manipulated to the position of FIG. 9, they will remain in such position until manually returned to operative position.

For the purpose of locking the assembly 270 in position such as is shown in FIG. 8, a locking bar 342 is provided. This locking bar 342 is pivotally mounted on the side wall 70 as by the pivot member 344 and is provided with a laterally directed end portion 346 carrying a screw threaded member 348 and associated lock nut 350, the former of which bears against the rear side of the assembly 270 and serves to hold the same in the position shown in FIG. 8. The forward end of the pivot lever or bar 342 terminates in a manually operable portion 352 as can also be seen in FIG. 1. Thus, it will be manifest that the two members 352 and 306 are manipulated simultaneously when it is desired to position the components in the relative position as is shown in FIG. 9.

A suitable spring member of hair pin construction may be provided to normally urge the lever 342 to the operative position shown in FIG. 8. Such a spring is shown in FIG. 8 having its opposite end portions 354 and 356 engaged respectively with the lever 342 and with a pin 358 carried by the side wall 70.

Referring at this time more particularly to FIGS. 3 and 7 simultaneously, details of the chart paper transport system will be more clearly apparent therefrom. In FIG. 7, the supply roll 108 as shown therein will be seen to be supported in between a pair of fixed cradle members indicated generally therein by reference characters 370 and 372. Each of these cradle members is constructed of a configuration as is shown in FIG. 10 of the drawings, each including a well portion 374 to receive a corresponding end portion of the roll assembly 108. These wells are opened as at 376 so that the roll assembly may be easily engaged and disengaged with respect to the cradle assembly 370 and 372. It can also be seen in FIG. 7, the core of the roll assembly 108 is of a special configuration to achieve the correct mounting relationship with the assemblage as is shown. For this purpose, the core includes a central tube member 378 pinned as at 380 to the spool portion 382 of a spindle member 384. This spindle has associated therewith a ball bearing assembly indicated generally by the reference character 386 which is the entity which is actually received in the corresponding well 374 of the cradle member 372. The opposite end of the tube 378 is provided with a spindle member 388 which likewise mounts a ball bearing or roller member 390 received in the wall of the cradle member 370. The spindle 388 is provided with a relatively small flange portion 392 whereas the opposite spindle member is provided with a much enlarged flange portion 394, the purpose of which will be presently apparent.

It will be seen that the spindle member 388 is rigidly affixed to a tube 389 which is telescopically engaged within the outer tube 378. Thus, it will be readily apparent that the two spindle assemblies can be separated from each other to insert a new supply or roll of record paper or chart material thereon. Should it be desirable at any time to utilize a supply of record or chart material which is of lesser width than the standard size as between the two flanges 392 and 394, a dummy flange assembly indicated generally by the reference character 396 may be associated therewith. Such dummy includes a spool portion 398 and a flange 400 disposed as is shown. In the case of utilization of the dummy 396, the flange 400 takes the place of the flange 392 on the spindle assembly 388 and provides a mounting means for a roll of chart material which is of width substantially coextensive with the spacing between the flange 400 and the flange 394 on the spindle assembly 384.

The drive roll assembly 100 as is shown in FIG. 7 will be seen to include a centrally extending shaft member having stub axle end portions 404 and 406 which are received in ball bearing assemblies 408 and 410 respectively which are mounted in turn within the pillow block assemblies 412 and 414. The pillow block 412 is provided with a threaded counterbore 416 receiving a plug member 418 cooperating with the compression spring 420, the cap 422 and the ball member 424 received in the countersunk end portion 426 of the stub axle 404 to exert an axial preload upon the assembly 100 as will be readily apparent. Each of the pillow blocks is provided with an enlarged flange 428 and 430 respectively by means of which these assemblies are rigidly affixed to their corresponding side walls 70 or 72. The pillow block assembly 412 is provided with a stepped inner end portion receiving a flange member 432 and there are provided a plurality of fasteners such as fasteners 434 to hold this flange member 432 in place. Likewise, the pillow block assembly 414 is provided with a cooperating flange member 436 which is bored to receive the shouldered portion 438 of the drive roller 100 and which is rigidly in place as by fasteners 440 also serving to hold the flange 430 against the side wall 72. These two flanges 432 and 436 serve to provide a guide for the record sheet being driven by the roll 100.

As can be seen in FIG. 7, the flange 436 is spaced from the corresponding side wall 72 and disposed within this space and rigidly affixed to the shouldered portion 432 of the shaft 100 as by screw threaded fasteners 440 is a drive gear member 442 by means of which rotary motion is imparted to the roll 100. Referring back to FIG. 3, a transmission mechanism is indicated generally by the reference character 444 therein suitably mounted between the side walls 70 and 72 and having associated therewith any suitable source of power such as electric motor not shown. The previously mentioned flexible shaft 212 is connected to one of the output points of this transmission device 444 so as to achieve drive therefor in conjunction with chart paper drive. However, it will be understood that due to the worm and gear connection 210, 224 in particular, the speed of rotation imparted to spindle 156 is materially less than the speed of rotation of drive roll 100. The purpose of this will be presently apparent.

One of the output shafts for the transmission device 444 is illustrated in FIG. 4 of the drawings. This shaft is represented as at 446 and shown in dotted lines therein is a gear train including gears 448 and 450 which are in operative engagement with the previously mentioned gear 442 connected to the shaft 100. Thus, a direct gear drive is imparted between the transmission device 444 and the drive roll 100.

FIG. 4 also illustrates the takeup drive mechanism for the chart material or recording paper. This consists of a pulley 452 rigid with the transmission output shaft 446 over which a belt 454 is trained, such belt also being trained about a further pulley 456 carried at the opposite end of arm 458 about the shaft 460. This arm 458 is pivotally attached at its upper end to the output shaft 446 as is shown, there being suitable means for adjusting the link of the arm 458 to compensate for stretching of the belt 454. Also fixed to the shaft 460 is a further pulley 462 and a further arm 464 is mounted on such shaft 460 and extended therefrom for pivotal connection with the takeup roll shaft 466 mounting a takeup roll member 468 thereon. The shaft 466 mounts a further pulley 470 cooperable with the pulley 462 and with the belt 472 trained over both of these pulleys to impart rotational motion to the shaft 466 and the core 468 to effect a takeup of the chart paper fed thereonto. For a purpose more fully described hereinafter the rotational speed of the shaft 466 is some five to ten percent faster than the speed imparted to the drive roller 100 by means of suitable selection of pulleys 452, 456, 462 and 470.

The vertically swinging door 32, see particularly FIGS. 3 and 4, mounts a pair of brackets 480 and 482 adjacent its opposite ends which rotatably support the takeup shaft 466, see also particularly FIGS. 16–18. Slotted links 484–486, pivotally mounted on bracket 35, are operatively associated with the two brackets 480 and 482 to limit the movement of the door 32 to the position shown in FIG. 16. In FIGS. 16–18, it can be seen that the arm 458 includes an upper portion 490 adjustably straddled and connected to as by fasteners 492 and 494 between the arm members 496 and 498, see particularly FIG. 18. These arm members 496 and 498 are provided with spaced foot portions 500 and 502 which carry the shaft 460 therebetween as shown. As can be seen, the shaft 460 is stationary, being held by circlip member 504 against axial displacement relative to the foot portions 500 and 502 and rotatably mounting thereon a quill shaft member 506. One end of this quill shaft is threaded as at 508 and carries a nut member 510 for imparting a desired preloading of the compression spring 512. This compression spring bears against a driven plate member 514 suitably feathered to the quill shaft 506 and engaging against a friction plate element 516 in turn engaged against the opposing face of the pulley 456. Then again, the two pulleys 456 and 462 are spaced apart by an interposed friction disc member 518. The pulley 462, as can be seen, is rigidly affixed to the quill shaft 506 by means of a set screw 520. Therefore, the quill shaft 506 is driven by the pulley 462 which in turn, through the friction disc 518, drives the pulley 456. However, due to the presence of the compression spring 512, and dependent upon the sandwiching pressure achieved thereby, the two pulleys 456 and 462 are coupled in such manner to accommodate for overload release as will be presently apparent.

The record sheet take-up mechanism is more clearly illustrated in FIGURE 19. In this figure, the course of the take-up roll includes the previously mentioned shaft 466 and the core member 468 slip-fitted over the shaft 66 and having driving engagement therewith by virtue of the pin 530 received in the notched end 532 of the core member 468. This is similar to the driving connection achieved between the shaft 368 by means of the pins 380 on the paper supply roll.

As can be seen in FIGURE 19, the bracket 482 is recessed to receive a retaining spool 534 fixedly secured thereto as by fasteners 536 and which includes an outstanding sleeve portion 538. The sleeve portion is provided with a projecting nose 540 whose end as at 542 lies flush with the inner side of the brackets 482 and which is provided with a counterbore 544 housing a compression spring 546. This compression spring bears against the plunger head 548 slidably disposed in the counterbore 544 and which plunger head in the normal position as is shown projects beyond the end 542 into the confines of the bushing member 550 pressed into one end of the shaft 466. The plunger head 548 is connected by a stem 552 to a cap member 554 having a plurality of pins 556 disposed in circumferentially spaced relationship thereon and projecting into registering bores 558 in the sleeve 538. The opposite end of the shaft 466 carries a plug-like bushing member 560 retained by the previously mentioned pin 530 and being provided with a counterbore 562 receiving the plunger head 564. This plunger head 564 is fluted or splined or otherwise provided with means for clutching connection to the counterbore 562 of the bushing member 560 so that in response to rotation of the head 564, rotary motion is imparted to the shaft 466. The plunger head 564 connects to a stem 566 to a cap member 568 provided with pins 570 similar to the pins 556 which extend into respective openings 572 in the previously mentioned pulley member 470. Thus, as drive is imparted to the pulley member 470, the pins 570 drive the stem 566 as through the dental clutch connection between the plunger head 564 and the counterbore portion 562 of the shaft 466, the take-up core is driven. The bracket 480 is bored and counterbored to receive a bushing member 574 which projects through the bracket 480 and is provided with a retaining flange 576 as shown and which rotatably receives the pulley 470. The outer end of this bushing 574 engages against the inner surface of the cap member 568 and in order to provide a slight spacing between the cap member 568 and the pulley 470, a spacer ring 580 may be provided therebetween as is shown and in surrounding relationship to the outer end of the bushing member 574. The compression spring 582 is received within a counterbore in the bushing member 574 and acts between this bushing member and the plunger head 564 to normally urge the tongue 565 into the slot 567 as will be readily appreciated.

Referring to FIGURE 10, as previously described, the panel 58 is selectively pivotal either about its upper edge or about its lower edge. For this purpose, the pairs of pivot pins 60 or 64 are provided as previously described and as shown in FIGURE 10, latching levers 590, its opposite member being indicated by reference character 592 in FIGURE 4 are pivoted to the side walls 70 and 72 respectively by pivot members 594 and 596 and each such lever has associated therewith a tension spring such as the springs 598 and 600, see also FIGURE 11, which normally urge these springs upwardly, such springs being acted on their respective side walls 70 and 72. The forward end of each lever is provided with an upraised portion 602, see particularly FIGURE 10, and the forward extremities 604 and 606 project outwardly through the panel 28 for manipulation by the operator. Thus, the levers 590 and 592 normally retain the pins 64 captive between the vertical and horizontal section of the brackets 66 and the headed portions 602 of the levers. However, at any such time as it is desired to pivot the panel 58 about its upper pivots, the lower pivots are released by means of the levers 590 and 592.

To contribute to the control of the panel 58 when it is pivoted either about its upper or lower edge, link means are utilized at either side thereof. Thus, as shown in FIGURE 10, the link means at one side consists of a bracket 610 affixed to the inner face of the panel 58 and carrying a pivot pin 612 receiving one end of a link arm 614, the opposite end of which is pivoted as at 616 by means of a suitable pin to a further link arm 618 which is anchored at its inner end as at 620 to the respective side walls 70. A similar linkage arrangement is utilized at the opposite side of the panel 58 as is shown in FIGURE 4. In FIGURE 4, the panel bracket is indicated by reference character 622 and the two link arms by reference characters 624 and 626. Thus, when the panel is pivoted about its lower edge as is shown in FIGURE 10, the same will be permitted to pivot to a position in which the two links 626 engage corresponding stop pins 627 on the side walls with the panel 58 in generally horizontal position as shown. In this position, the links form ramps to aid in the loading of a new supply of record paper or chart sheet. The respective side walls 70 and 72 are provided with ramp brackets indicated generally by reference characters 630 and 632. As is shown in FIGURE 10, each such bracket includes a vertical leg portion 634 and a laterally inwardly projecting horizontal leg portion 636, each bracket being secured to its respective side wall as by fasteners 638 and the flanges 636 being so located as to glide smoothly into the openings 376 of the cradling members 370 and 372.

Thus, it will be noted that the two links 614 and 618 provide, along their upper edges as indicated by reference character 640, a supporting surface which merges substantially smoothly with the supporting surfaces of the flanges 636 so that as a new supply of chart paper or record sheet is guided into the trough 374, the ball bearings 386 and 390, see particularly FIGURE 7, may rest and ride upon these surfaces 640 and 636 and accurately guide the new roll in proper position for ultimate disposition with the ball bearings received in the trough portion 374 as previously set forth.

Referring at this time to FIGURE 11, the assemblage as shown therein will be seen to incorporate a compound brake system designated generally by reference characters 650 and 652 which cooperate and act in conjunction with the previously mentioned enlarged flange portion 394 on the spool which receives the supply of chart papers 86. This brake system is such that the brake 650 is normally not operative and is only operative for a specific purpose as more specifically set forth hereinafter. However, the brake mechanism 652 is adapted to exert a more or less constant tension on the paper between the supply roll 86 and the driving roll 100 regardless of the diameter of the supply left on the roll.

Insofar as the brake 650 is concerned, the same consists of a substantially vertically disposed lever 654 pivoted as at 656 to the side wall 72 and having an extension 658 carrying a suitable brake shoe matting member 660 to which is affixed a strip 662 of brake shoe material adapted to engage the peripheral surface of the flange 394 when this brake is operative. Normally, the brake lever 654 is urged by tension spring 664 into operative engagement with the flange 394. However, the operation of the brake is tied in with the slack take-up bar 90 previously mentioned. For this purpose, a flexible cable 666 having a stud 668 at one end received slidably within the boss portion 670 at the lower end of the lever 654 and thus adjustable relative thereto by means of the nut members 672 and 674 is connected at its opposite end by suitable link member 676 and fastener 678 to the lower end 680 of a normally upright arm 682 to the upper end of which one end of the bar 90 is affixed. As can be seen in FIGURE 7, the arm 682 has its counterpart at the opposite side of the machine as indicated by reference character 684. Both of these arms 682 and 684 are apertured adjacent their lower ends to receive reduce end portions of a cross shaft 686 and they are both secured fixedly thereto as by means of set screws 688 and 690. The opposite extremitites of the cross shaft 686 are further reduced as indicated by reference characters 692 and 694 for reception within bushing members 696 and 698 carried by blocks 700 and 702, each of which is provided with an enlarged flange portion 704 fixed to its corresponding side wall as by fasteners 706. Pairs of limit stop pins 708, see FIGURE 7, and 710, see FIGURE 11, are provided in the path of movement of the arms 682 and 684 for the purpose of limiting their positions between the two dotted lines positions shown in FIGURE 11.

The purpose of this bar 90 and its associated brake mechanism 650 will be appreicated from a study of FIGURE 11. As the machine is operating, the sheet of paper as shown at 712 in FIGURE 11 passes under the bar 90 and during normal constant speed operation, due to the constant tension brake mechanism 652, this portion of the paper between the supply roll 86 and the drive roll 100 will be subjected to sufficient tension to maintain the bar 90 in the substantially upright position of the arms 682 and 684 shown in dotted lines in FIGURE 11, with such arms engaged against the stop pins 708. The transmission mechanism 644 which forms no part specifically of the present invention is capable of imparting various drive speeds to the drive roll 100, the specific speed being selected by actuation of one of the switches 714 on the front of the panel 28, see particularly FIGURES 1 and 2. If the machine is operated from a relatively high speed suddenly to a relatively low speed, the intertial effect of the supply roll will tend to create a slack condition between the drive roll 100 and the supply roll 86. When such action occurs, the bar 90 will drop to some intermediate position such as is shown in FIGURE 11 in full lines, toward the limit position where it is engaged against the stop pin 710 and take up this slack and maintain the proper tension in the sheet 712. Of course, as the bar 90 drops from the dotted line position against the stop 708 as shown in FIGURE 11, the brake mechanism 650 will be actuated to complement the braking action of the mechanism 652 during the interim between the time in which the inertial action of the supply roll assembly has been overcome and until the bar 90 is moved back upwardly so that the arms are engaging with the stop 708 which represents the normal position at a steady state of speed of the mechanism.

The details of the brake mechanism 652 will be seen from a study of FIGURES 12-15, inclusive. As can be seen in these figures, the mechanism 652 consists essentially of an elongate strap 730 pivoted about the axis 732 in FIGURE 13 so that the arm or strap 730 can follow the supply of paper 86, see particularly FIGURE 11 as the same diminishes in size as for example as is shown in full and dotted lines in FIGURE 13. That is to say, the laterally deflected end portion 734 of the arm 730 is adapted to rest against the supply stock of paper. The lower extremity of this arm, see particularly FIGURE 12, carries a brake shoe matting member of generally U-shaped configuration, see also FIGURE 15. This member or bracket presents a pair of depending leg portions 736 and 738 which receive a matting pin 740 by means of which the brake shoe assembly indicated generally by the reference character 742 is carried thereby. This shoe assembly 742 carries a block of brake lining material 744, which engages on the inner side face of the flange member 394 as shown.

At a point between its ends, the arm 730 is provided with a pair of laterally projecting fingers 750 and 752, see particularly FIGURE 14. These fingers are received pivotally upon a pin member 754 carried by a carrier assembly indicated generally by the reference character 756. The carrier assembly is of generally U-shaped configuration in cross section including the bight portion 758 and the parallel legs 760 and 762. The use of the arm 730 in the region of the carrier 756 is such as to sit freely between the two arms 760 and 762 between which also the pins 754 is carried as will be clearly seen in FIGURE 14. Thus, the arms 730 is pivotally attached to the carrier 756 about the axis of the pin member 754 or in a direction normal to the inner surface of the flange 394. The carrier member 756 in turn is fixedly secured to a stud member 764 which is rotatably mounted in a bushing block 766 flanged as at 768 and secured as by fasteners 770 to the side wall 72 as is shown in FIGURE 12. This stud 764 is provided with an elongate bearing surface 772 which is rotatably received in the bore of the bushing block 766. The stud has an integral flange portion 774 which bears against one end of the bushing block 766 and the outer extremities thereof receive a headed screw member 776 bearing against the outer face of the bushing block 766 to thus axially locate the stud member 764. The inner extremity of this stud member is provided with a threaded portion 778 receiving a clamping nut 780 which serves to sandwich the carrier member 756 and at inner brackets 782 between such nut and the flange 774 fixed to the stud member. Thus, the carrier 756 and the transmitter member 782 are for all practical purposes rigidly affixed to the stud 764 which is pivotally mounted in the bushing block 766.

To normally effect engagement of the brake shoe assembly 754 with the flange 394, a stud 784 is fixed at one end to the carrier member 756, see particularly FIGURE 14, extends therefrom through the lever 730 and receives at its opposite extremities an adjustable nut member 786 which serves to compress the spring member 788 which bears, through the medium of the washer 790 against the arm 730 as will be readily apparent. Thus, a constant frictional drag force will be imparted normally against the flange 394 whose movement arm is variable in accordance with the supply of paper left on the roll 86 since the arm 730 is forced to follow the paper supply, in a manner presently set forth.

The transmitter member 782 is provided with a laterally directed flange portion 792 to which one end of a flexible cable 794 is fixed. This cable extends over an idler pulley 796 pivotally mounted as at 798 to the side wall 72 and then to be wrapped about the hub 800 of a pulley member 802. The pulley 802 is pivotally mounted on the side wall 72 by means of a suitable headed pin member 804. The grooved periphery of this pulley 802 has one end of a cable 806 wrapped at least partially therearound and anchored thereto, such cable extending therefrom to the indicating wheel mechanism designated generally by the reference character 808 in FIGURE 5. The wheel 808 is provided with a peripherally extending indicating scale 810 and its hub portion 812 is pivotally mounted as by means of a suitable retaining pin member 814 to the side wall 72. The indicating scale is calibrated so as to denote the remaining footage of paper on the paper supply roll 378. The inner end of the pin 814 carries a spiral spring member 816 anchored at one end to the pin and at its other end to a suitable fastener 818 on the wheel 808 so as to eliminate slack from the cable 806.

At such time as the cams 300 and 192 are actuated to release the pins 60 at the upper corners of the panel 58 as for example may be occasioned when a new supply of record or chart paper is inserted, it is desirable to swing the lever 730 about its pivot 754 out of engagement with the flange 794 so as not to interfere with the loading and unloading operations of the supply roll. For this purpose, mechanisms hereinafter described is utilized in coincidence with the operation of the cam 300 and 192. This mechanism consists of a lever arm 820 pivotally mounted by means of a pin member 822 so that the lower end 824 of the lever arm and more especially the end 826 of the screw 828 carried thereby may engage against the upper end 830 of the arm 730 to swing the same about its pivot axis 754 away from the flange 394, see particularly FIGURE 12. To this end, it will be seen that the pivot pin 822 is carried between the depending leg portions 832 and 834 of a mounting bracket assembly indicated generally by the reference character 836. This mounting bracket 836 is provided with a vertical flange portion 838 secured as by fasteners 840 to the side wall 72 and projects laterally inwardly therefrom above the upward extremity of the brake mechanism 752. This bracket also mounts a pivot pin 842 carrying a pulley member 844 over which is trained the flexible cable 846 which is anchored at one end as at 848 to the upper extremity of the lever arm 820. As can be seen best in FIGURE 4, the opposite end of this cable 846 is anchored to the frame assembly 270 so that the cable is permitted to move in a slackening direction when the frame 270 is rocked back about its pivot axis 274 as previously described. This in turn permits the hair spring 850 to move the lever 820 so that the end 826 of the screw member 828 engages the extremity 830 of the lever 730 to move the same about the pin 754 so as to move away from the flange 394. For this purpose, it will be seen that the opposite ends of hair spring 850 bear against the stop pins 852 and 854 carried respectively by the bracket assembly 836 and the upper end of the lever 820.

As can be seen in FIGS. 1 and 2, the front panel portion 28 of the drawer assembly is also provided with an access door member 856, the purpose of which is to permit ready access to the carbon or transfer paper mechanism. Brackets 858, as for example as shown in FIG. 8, are attached to the opposite upper corners of the access door member 856 and these brackets receive pivot pin members 860 fixed to the side wall members 70 and 72 permitting the access door 856 to be moved between the positions shown for example in FIGS. 8 and 9. Normally, the access door 856 is urged to closed position such as is shown in FIG. 8 under the action of a spring member 862 which is provided with an intermediate loop or bight portion 864 mounted on a suitable pin 866 and having its opposite legs 868 and 870 engaged respectfully against the member 344 and the upper portion of one of the brackets 858, all as is specifically shown in FIG 8. Thus, it will be readily appreciated that access to the transport paper assembly may be usually had by swinging the door 856 upwardly about the axis of the pins 860.

To further aid in loading paper in the machine, the assembly shown best in FIG. 3 is provided. This assembly is in the form of a guide mechanism indicated generally by the reference character 872 and which consists of a sheet of material having an arcuate portion 874 as shown underlying the recording paper assembly 86 and mounted on suitable support members 876 secured between the side walls 70 and 72. In addition to the arcuate portion 874, there is a generally horizontally extending portion 878 which terminates in downturned end portion 880 and which may have attached thereto an extension portion 882 projecting forwardly therefrom to the crease 884 which is disposed immediately behind the lower edge of the door member 58 and which extends downwardly and inwardly in the portion 886 to terminate in the arcuate portion 888 closely spaced to the rear side of the drive roll 80. Thus, when the door 58 is swung downwardly about its lower pivot for the purpose of introducing a new roll of paper 86, the guide mechanism 872 aids in properly feeding the free end of the paper roll outwardly of the drawer structure to be projected over the outer end of the door portion 58 and the portion 886 and arcuate portion 888 are cooperable to permit the threading of the paper behind the power roll 100 and between such power roller and the pinch roller 102. To further aid in this threading action, additional deflectors or baffles 890 and 892 as well as the guide baffle 894 may be provided.

It is to be understood that certain changes and modifications as illustrated and described may be made without departing from the spirit of the invention or the scope of the following claims.

What is claimed is:

1. A recording mechanism including a supporting frame, a front panel member pivotally mounted adjacent one edge to said frame and having the opposite edge thereof presenting a writing edge, the combination including, in association with the above, means for feeding a sheet of recording paper over said writing edge, means for feeding a sheet of transfer paper over said recording paper at said writing edge, and stylus means for pressing said transfer paper locally against said recording paper at said writing edge, means for releasably locking said front panel against pivotal movement, and interlock means connecting the last means and said stylus means to move the stylus means out of the aforesaid writing position when said last means is released, brake mechanism for maintaining a predetermined tension on the recording paper, said interlock means being also connected to such brake mechanism to release the same when said last means is released.

2. A recording mechanism including a supporting frame, a front panel member pivotally mounted adjacent one edge to said frame and having the opposite edge thereof presenting a writing edge, the combination including, in association with the above, means for feeding a sheet of recording paper over said writing edge, means for feding a sheet of transfer paper over said recording paper at said writing edge, and stylus means for pressing said transfer paper locally against said recording paper at said writing edge, means for releasably locking said front panel against pivotal movement, and interlock means connecting the last means and said stylus means to move the stylus means out of the aforesaid writing position when said last means is released, brake mechanism for maintaining a predetermined tension on the recording paper, said interlock means being also connected to such brake mechanism to release the same when said last means is released, said means for feeding the recording paper being selectively controllable to operate at various speeds, and such feeding means including slack take-up tension means to maintain said recording sheet in predetermined tensioned condition when such feeding means is abruptly operated from high speed to low speed.

3. In a recording mechanism including a support cabinet structure having a drawer assembly therein, said drawer assembly including spaced side walls and a rigid front panel interconnecting the same, said front panel having an opening therein, a movable front panel disposed in said opening and pivotally mounted adjacent its lower edge to said rigid front panel, said movable panel having its upper and lower edges respectively spaced from the upper and lower edges of said opening to provide slots thereat, said rigid panel having a further opening therein substantially coextensive in width with and disposed below the first opening, a second movable panel disposed immediately below said rigid panel and defining a slot therewith, supply roll means mounted on said side walls behind said first movable panel, drive roll means mounted between said side walls below said lower edge of the first movable panel, and take-up roll means mounted between opposite sides of said cabinet structure behind said second movable panel, common drive means connected to said drive roll means and said take-up roll means whereby a sheet of recording paper mounted on said supply roll means may be threaded through the uppermost of said slots, downwardly over the front face of said first movable panel, thence through the slot at the lower edge of said first movable panel and into engagement with said drive roll means, thence outwardly through said second opening and downwardly to pass through the slot between said rigid panel and said second movable panel to said take-up roll means, said take-up roll means being driven at a greater speed than said drive roll means and including overload release clutch mechanism.

4. In a recording mechanism including a support cabinet structure having a drawer assembly therein, said drawer assembly including spaced side walls and a rigid front panel interconnecting the same, said front panel having an opening therein, a movable front panel disposed in said opening and pivotally mounted adjacent its lower edge to said rigid front panel, said movable panel having its upper and lower edges respectively spaced from the upper and lower edges of said opening to provide slots thereat, said rigid panel having a further opening therein substantially coextensive in width with and disposed below the first opening, a second movable panel disposed immediately below said rigid panel and defining a slot therewith, supply roll means mounted on said side walls behind said first movable panel, drive roll means mounted between said side walls below said lower edge of the first movable panel, and take-up roll means mounted between opposite sides of said cabinet structure behind said second movable panel, common drive means connected to said drive roll means and said take-up roll means whereby a sheet of recording paper mounted on said supply roll means may be threaded through the uppermost of said slots, downwardly over the front face of said first movable panel, thence through the slot at the lower edge of said first movable panel and into engagement with said drive roll means, thence outwardly through said second opening and downwardly to pass through the slot between said rigid panel and said second movable panel to said take-up roll means, means for feeding a sheet of transfer material across the upper edge of said first movable panel in overlying relation to the recording sheet, stylus means mounted between said side walls behind said first movable panel and adapted to press said transfer sheet against said recording sheet along said upper edge of the first movable panel, means releasably locking said first movable panel against pivotal movement, and interlock means connecting the last means and said stylus means to move the latter out of operative position when said last means is released.

5. In a recording mechanism including a support cabinet structure having a drawer assembly therein, said drawer assembly including spaced side walls and a rigid front panel interconnecting the same, said front panel having an opening therein, a movable front panel disposed in said opening and pivotally mounted adjacent its lower edge to said rigid front panel, said movable panel having its upper and lower edges respectively spaced from the upper and lower edges of said opening to provide slots thereat, said rigid panel having a further opening therein substantially coextensive in width with and disposed below the first opening, a second movable panel disposed immediately below said rigid panel and defining a slot therewith, supply roll means mounted on said side walls behind said first movable panel, drive roll means mounted between said side walls below said lower edge of the first movable panel, and take-up roll means mounted between opposite sides of said cabinet structure behind said second movable panel, common drive means connected to said drive roll means and said take-up roll means whereby a sheet of recording paper mounted on said supply roll means may be threaded through the uppermost of said slots, downwardly over the front face of said first movable panel, thence through the slot at the lower edge of said first movable panel and into engagement with said drive roll means, thence outwardly through said second opening and downwardly to pass through the slot between said rigid panel and said second movable panel to said take-up roll means, means for feeding a sheet of transfer material across the upper edge of said first movable panel in overlying relation to the recording sheet, said common drive means being also connected to the means for feeding the transfer sheet.

6. In a recording mechanism including a support cabinet structure having a drawer assembly therein, said drawer assembly including spaced side walls and a rigid front panel interconnecting the same, said front panel having an opening therein, a movable front panel disposed in said opening and pivotally mounted adjacent its lower edge to said rigid front panel, said movable panel having its upper and lower edges respectively spaced from the upper and lower edges of said opening to provide slots thereat, said rigid panel having a further opening therein substantially coextensive in width with and disposed below the first opening, a second movable panel disposed immediately below said rigid panel and defining a slot therewith, supply roll means mounted on said side walls behind said first movable panel, drive roll means mounted between said side walls below said lower edge of the first movable panel, and take-up roll means mounted between opposite sides of said cabinet structure behind said second movable panel, common drive means connected to said drive roll means and said take-up roll means whereby a sheet of recording paper mounted on said supply roll means may be threaded through the uppermost of said slots, downwardly over the front face of said first movable panel, thence through the slot at the lower edge of said first movable panel and into engagement with said drive roll means, thence outwardly through said second opening and downwardly to pass through the slot between said rigid panel and said second movable panel to said take-up roll means, means for feeding a sheet of transfer material across the upper edge of said first movable panel in overlying relation to the recording sheet, stylus means mounted between said side walls behind said first movable panel and adapted to press said transfer sheet against said recording sheet along said upper edge of the first movable panel, means releasably locking said first movable panel against pivotal movement, and interlock means connecting the last means and said stylus means to move the latter out of operative position when said last means is released, said common drive means being selectively operable at different drive speeds, slack take-up and tensioning means operable to maintain a predetermined tension in said recording sheet when said drive means is operated to abruptly decrease speed.

7. A paper transport system for recording machines, including a support assembly including spaced side walls, a movable front panel pivotally mounted adjacent one edge to said support assembly and defining a relatively sharp writing edge along its opposite edge, recording sheet supply roll means mounted between said side walls behind said movable panel, said movable panel being positionable between open and closed position, means for retaining said movable panel in closed position, said supply roll means including brake mechanism to effect tensioning of a recording sheet issuing therefrom, and interlock means connecting said retaining means and said brake mechanism to effect simultaneous release of said brake mechanism and said movable panel.

8. In a recording mechanism, a cabinet structure including a drawer having a front panel, said front panel having an opening therein and there being a movable panel mounted on the drawer within the opening in said front panel, said movable panel having an upper edge portion inset with respect to that edge of said front panel defining the upper extremity of the opening therein, whereby to present a slot thereat, paper supply support means mounted in said drawer behind said front panel thereof to permit paper to issue therefrom through said slot and downwardly over the outer face of said front panel, paper drive means mounted on said drawer below said movable panel thereof and cooperable with said paper supply support means to maintain paper taut over both said outer surface and upper edge of said movable panel, transfer paper supply means mounted on said drawer for issuing transfer paper therefrom over the first mentioned paper at said upper edge of the movable panel, transfer paper drive means mounted on said drawer for maintaining transfer paper taut in the region of said upper edge of the movable panel, and stylus means mounted in said drawer and including a movable stylus bearing upon the transfer paper at said upper edge of the movable panel.

9. In a recording mechanism, the combination of a cabinet structure having a drawer assembly movably mounted therein, an access door hingedly mounted adjacent its lower edge to said cabinet structure and having its upper edge disposed in close proximity to said drawer, said drawer assembly having a front panel provided with an opening, a movable panel pivotally secured adjacent its lower edge to said front panel and having its upper edge inset from that edge of the front panel defining the upper edge of said opening to provide a slot thereat, said front panel having a second opening below the first opening therein, sheet roll support means mounted in said drawer assembly behind said front panel to issue a sheet of recording material therefrom through said slot downwardly over the outer face of said front panel and thence into said second opening therein, feed roll means mounted in said drawer assembly behind said second opening to maintain said recording material taut over said outer face of the front panel and against the upper edge thereof and to issue such material outwardly of said second opening, and recording material take-up means mounted on said access door to take in recording material through the opening between the upper edge of the access door and the lower edge of said front panel.

10. In the combination as defined in claim 9 including means for issuing transfer sheet material over said upper edge of the movable panels against the recording material, and stylus means movably mounted in said drawer assembly to press the transfer material against the recording material at said upper edge of the movable panel.

11. In the combination as defined in claim 9 including means for issuing transfer sheet material over said upper edge of the movable panels against the recording material, stylus means movably mounted in said drawer assembly to press the transfer material against the recording material at said upper edge of the movable panel, and means for simultaneously releasing said movable panel for pivotal movement about its mounting axis and for moving said stylus means away from said upper edge of the movable panel.

References Cited in the file of this patent

UNITED STATES PATENTS

| | | |
|---|---|---|
| 1,023,165 | Oehring | Apr. 16, 1912 |
| 2,718,450 | Leonard et al. | Sept. 20, 1955 |
| 2,719,293 | Hornbruch et al. | Sept. 27, 1955 |
| 2,847,866 | Thurmond | Aug. 19, 1958 |
| 2,888,310 | Perry | May 26, 1959 |
| 3,047,865 | Schaeder | July 31, 1962 |